UNITED STATES PATENT OFFICE.

KARL AUGUST KÜHNE, OF DRESDEN, GERMANY, ASSIGNOR TO TITAN GESELLSCHAFT MIT BESCHRANKTER HAFTUNG, OF DRESDEN, GERMANY.

PROCESS FOR THE REDUCTION OF REFRACTORY OXIDS.

No. 910,394.  Specification of Letters Patent.  Patented Jan. 19, 1909.

Original application filed June 11, 1907, Serial No. 378,453. Divided and this application filed December 24, 1907. Serial No. 407,968.

*To all whom it may concern:*

Be it known that I, KARL AUGUST KÜHNE, a subject of the King of Saxony, and residing at Dresden, Voglerstrasse No. 23, Germany, have invented certain new and useful Improvements in Processes for the Reduction of Refractory Oxids, of which the following is a full, clear, and exact description.

By Patent 861129 I have obtained protection for a process for the production of such metals and metalloids as cannot be obtained in fused form by Goldschmidt's process.

In my above patent refractory oxids are reduced by mixing the oxygen compounds of the elements in question with aluminium and chlorates or perchlorates, the mixture then being ignited. In consequence of the chlorates giving off their oxygen easily, the aluminium burns with extreme rapidity causing the production of an exceptionally high temperature by which even the most refractory oxids are reduced.

I have now found, that the chlorates or perchlorates may be replaced by other substances, which also give off their oxygen easily, such as peroxids.

I am aware, that it has been proposed before this to mix barium oxid and aluminium powder for starting the reaction in the original Goldschmidt process and that peroxids themselves have been reduced by the usual Goldschmidt process, but my process neither refers to the starting of the reaction nor to the reduction of the peroxid itself.

In the known processes there are only two components, the peroxid and the aluminium, while I have three components, the refractory oxid it is intended to reduce, the aluminium and the peroxid which is added only for the purpose that its oxygen may, by increasing the rate of oxidation, raise the temperature so high, that even those oxids may be reduced, that could not be reduced by the original Goldschmidt process. The higher oxids of the metals here in question TiO$_2$, titanic-acid, V$_2$O$_5$, vanadium pentoxid, ThO$_2$, thorium dioxid, CeO$_2$, cerium dioxid, ZrO$_2$, zirconium dioxid, are not compounds that easily lose their oxygen. For instance the thorium dioxid is formed when thorium is heated to 100—200 degrees with a bright flame, thus showing clearly, that the affinity of oxygen to thorium is too great to be overcome easily, even at higher temperature. Titanium dioxid and vanadium pentoxid may in fact be used as raw materials for the production of the metals and even they require the addition of another highly oxygenated compound, which gives off its oxygen easily, for instance barium-peroxid, BaO$_2$, or sodium-peroxid, Na$_2$O$_2$.

It has been further found, that the separation of the whole metal in the mixture can be accomplished only when care is taken to produce a slag which is as thinly fluid as possible. The slag which is formed by the addition of the chlorates or peroxids is not fluid enough to allow the whole of the metal to sink through to the bottom of the crucible, large or small parts of the reduced metal being retained by the slag and are thus lost. However, if care is taken that by suitable additions as for instance fluorspar, lime and the like, the slag is made as thinly fluid as possible no metal is retained by the slag as beforementioned and the yield is consequently much better.

As the quantities of aluminium and peroxid have to be adjusted according to the fineness of the aluminium and other circumstances, it is not possible, to give the fixed proportions of the component parts, but taking the production of titanium, the following has been proved to yield good results, viz: 80 parts by weight of titanic dioxid, 54 parts by weight of aluminium, 169 parts by weight of baric peroxid. The reaction then would follow the formula:

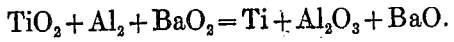

$$TiO_2 + Al_2 + BaO_2 = Ti + Al_2O_3 + BaO.$$

These proportions are but samples, as under different circumstances the proportions may change. Sometimes the peroxid itself is reduced to metal.

As peroxids which may be used barium peroxid, lead peroxid and sodium peroxid may be mentioned.

I claim:

1. The process for the reduction of highly refractory oxids, which consists in mixing throughout the mass, peroxids of metals easily giving off their oxygen and other than those of the elements to be reduced, with the aluminium and oxygen-containing compounds of said elements, and then igniting the mixture, substantially as described.

2. The process for the reduction of highly refractory oxids which consists in mixing throughout the mass thereof aluminium and the peroxid of an alkali metal other than the element to be reduced and easily giving off its oxygen, and then igniting the mixture.

3. The process for the reduction of highly refractory oxids which consists in mixing throughout the mass thereof aluminium and the peroxid of a metal other than the element to be reduced and easily giving off its oxygen and a flux and then igniting the mixture.

KARL AUGUST KÜHNE.

Witnesses:
　PAUL ARRAS,
　CLÁRE SIMON.